Figure 1:
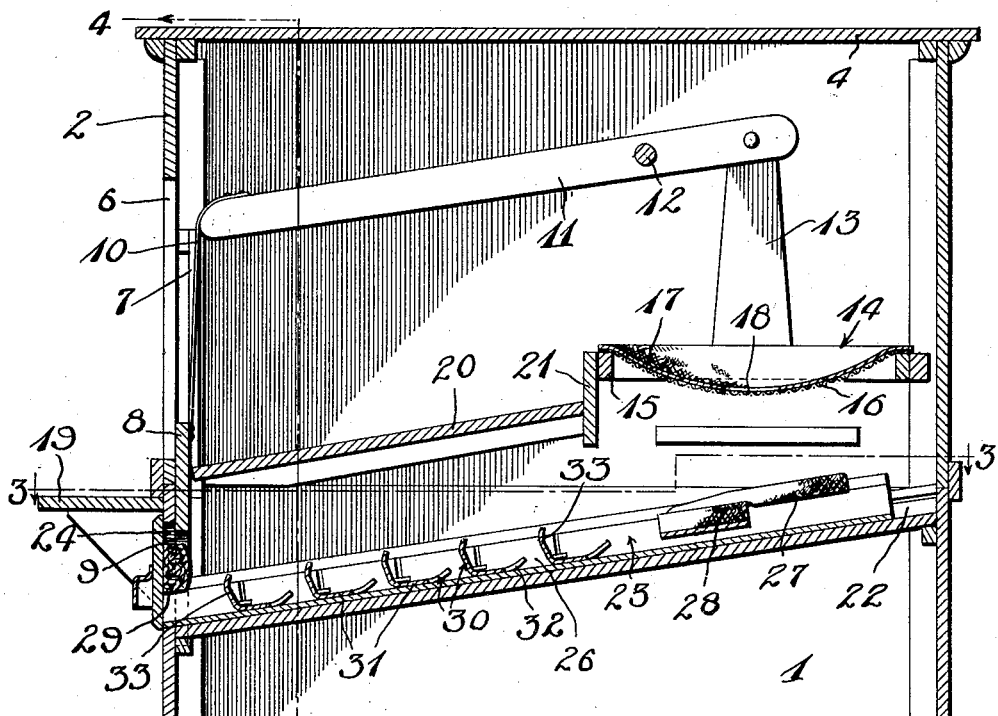

G. L. CARR.
TRAP NEST AND EGG RECEPTACLE.
APPLICATION FILED MAR. 22, 1915.

1,163,890.

Patented Dec. 14, 1915.
2 SHEETS—SHEET 1.

Witnesses

Inventor
George L. Carr
by H. B. Willson & Co.
Attorneys

G. L. CARR.
TRAP NEST AND EGG RECEPTACLE.
APPLICATION FILED MAR. 22, 1915.
1,163,890.
Patented Dec. 14, 1915.
2 SHEETS—SHEET 2.
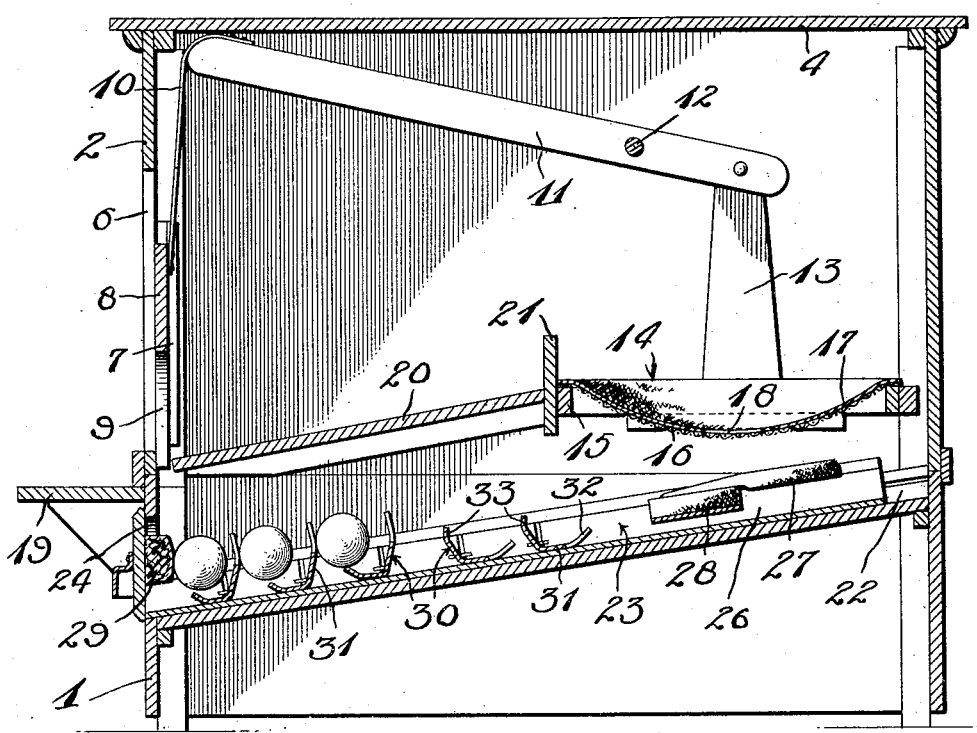
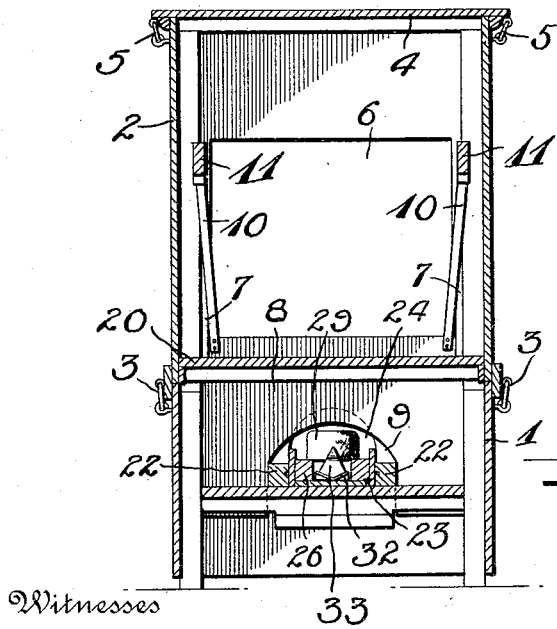
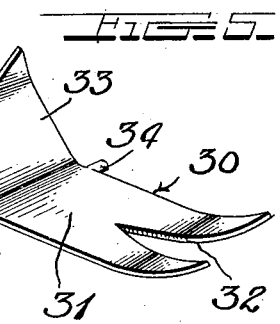
Inventor
George L. Carr

UNITED STATES PATENT OFFICE.

GEORGE L. CARR, OF WAYLAND, NEW YORK, ASSIGNOR OF ONE-HALF TO DANIEL W. CAMPBELL, OF ENFIELD, NEW HAMPSHIRE.

TRAP-NEST AND EGG-RECEPTACLE.

1,163,890. Specification of Letters Patent. Patented Dec. 14, 1915.

Application filed March 22, 1915. Serial No. 16,099.

*To all whom it may concern:*

Be it known that I, GEORGE L. CARR, a citizen of the United States, residing at Wayland, in the county of Steuben and State of New York, have invented certain new and useful Improvements in Trap-Nests and Egg-Receptacles; and I do declare the following to be a full, clear, and exact description of the invention, such as will enable others skilled in the art to which it appertains to make and use the same.

My invention relates broadly to improvements in poultry culture and specifically to a trap nest having means receiving the eggs laid by the fowls trapped therein.

The main object of the invention is to provide a device of this class which although being very simple in construction, will be highly efficient in operation and will prevent the breakage of eggs deposited therein.

To this end, the invention resides in certain novel features of construction and combination hereinafter described and claimed.

In describing the invention, I shall refer to the accompanying drawings wherein like reference characters designate corresponding parts throughout the various views and wherein:—

Figure 3:
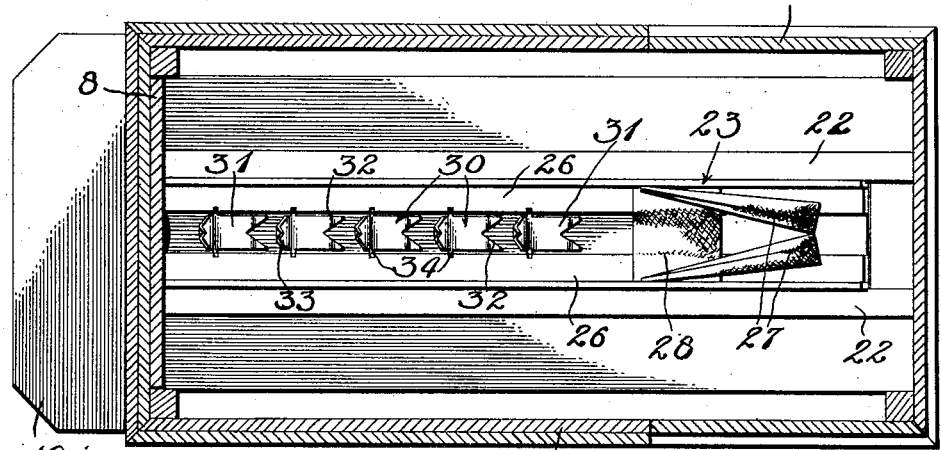

Figure 1 is a longitudinal sectional view of a device constructed in accordance with my invention, the parts thereof being shown in their normal positions; Fig. 2 is a similar view showing the position of parts upon the entrance of a hen, and illustrating a number of eggs in the egg receptacle; Fig. 3 is a horizontal section as seen along the plane indicated by the line 3—3 of Fig. 1; Fig. 4 is a vertical transverse section taken on the line 4—4 of Fig. 1; Fig. 5 is a perspective view of one of the movable egg checks to be described.

In the accompanying drawings, constituting a part of the application, the numerals 1 and 2 designate respectively, the lower and upper sections of a rectangular casing, the section 2 being removably positioned upon the lower section 1 and being held thereon by hooks 3 or the equivalents thereof, while said section 2 is provided with a removable top 4 secured thereon by hooks or the like 5.

Formed in one end of the upper section 2, is a doorway 6, and immediately adjacent the sides of this doorway, upright guides 7 are disposed, these guides being provided for the reception of a vertically moving door 8 whose lower edge is provided with a notch 9 for a purpose to be described. The upper corners of the door 8 are connected by a pair of leaf springs 10 to the forward ends of a pair of horizontal levers 11 which are disposed longitudinally within the section 2 and fulcrumed between their ends upon a transverse rod 12 therein. The rear ends of the levers 11 are pivotally connected to the upper ends of hangers 13 which may be of any preferred construction, while said hangers support a vertically movable nest 14.

The nest 14 may be of any preferred construction, but is preferably in the form of a rectangular frame 15 having a depressed wire mesh covering 16, this mesh covering being in turn provided with a covering 17 of cloth or the like. Both of the coverings 16 and 17 are provided with alined central openings 18, whereby an egg deposited in the nest and rolling to the center thereof may be discharged through these openings, these eggs being received by means yet to be described.

In order to allow the fowls to readily enter the section 2, and thereby enter the nest compartment in the rear end thereof, any preferred type of ledge 19 is employed adjacent the lower side of the doorway 6, and as clearly shown in Figs. 1 and 2, a floor 20 leads rearwardly from this door opening to a point immediately in advance of the nest 14. At this point, however, an upright transversely disposed partition 21 is located, this partition extending appropriate amounts above and below the floor 20 for effectively guiding the nest 14 in its vertical movement, it being understood that said nest is normally disposed in raised position, and that the weight of the door 8 retains it in this position, the door being then lowered to allow a hen to enter the nest. Upon stepping from the floor 20 onto the nest 14, however, the hen's weight overbalances the weight of the door 8 with the result that the latter is moved upwardly to close the doorway 6, thus preventing other hens from entering the nest while the one hen is trapped therein.

Mounted in any preferred type of guides 22 which incline downwardly and forwardly from the upper edge of the rear end of the section 1, is an egg chute 23 here shown in the form of a removable drawer whose front end projects through an opening 24 in the front end wall of said section 1, the drawer at this point being provided with an upright front end wall having any preferred type of handle by which the entire drawer may be removed from the section 1 and inserted into the same.

In the drawings, the chute 23 is shown as U-shaped in cross section and as having a pair of tracks 26 disposed in its lower corners, whereby to provide a longitudinal channel between these tracks.

Since the chute 23 is to receive therein eggs which are dropped through the openings 18, it becomes expedient to provide means whereby such eggs are prevented from being broken, not only when they come in contact with the chute, but as they roll downwardly thereon and are suddenly checked in their movement. For the first-named purpose, a pair of upwardly converging receiving fingers 27 is secured to the tracks 26, near the upper ends thereof, the meeting upper ends of the fingers 27 being disposed directly beneath the openings 18. It therefore follows, that if the fingers 27 are constructed of resilient material as they preferably are, the eggs deposited thereon will not be broken but will roll downwardly upon the two tracks 26. Were the eggs allowed to suddenly strike these tracks, there would be danger of breakage, it being therefore essential to equip the chute with a cushioning device for absorbing the shock as the eggs roll from the fingers 27. Although this device could be in practically any preferred form, it is embodied in the present application in the form of a sheet of flexible material 28 whose edges are secured to the tracks 26 while its intermediate portion is depressed longitudinally as shown. By this detail of construction, the eggs will be deposited upon the tracks 26 without breakage. Were the individual eggs now allowed to all roll to the lower end of the chute, breakage would undoubtedly occur, it being therefore expedient to provide a cushion or egg check 29 at the lower end of the chute and against which the first egg traveling down the latter is adapted to rest. Needless to say, if other eggs were now allowed to roll down the chute into contact with the first egg at the lower end thereof, it would be practically impossible to prevent breakage. This difficulty has been overcome, however, by the provision of a plurality of normally inactive resilient egg checks 30 which are so constructed as to cause them to be disposed to active position when an egg remains in contact with an operating member, with which each of said checks is provided. In this provision lies one of the most salient features of the invention, the construction employed being also unique as will be apparent from the following description.

Each of the checks 30 comprises a bottom plate 31 which is preferably notched at its rear end as seen at 32, said rear end being curved upwardly in most instances, as clearly shown in Figs. 1, 2 and 5, while upright actuating fingers 33 are formed integrally and rise from the lower ends of the plates 31, the checks 30 thus formed, being provided with stub shafts or pivots 34 which project laterally therefrom at the points at which the plates 31 and 33 join. By overbalancing the one end of the members 30, it will be evident that the actuating fingers 33 will project upwardly at all times, such fingers being shown in the drawings as rising above the plane in which the upper sides of the tracks 26 are disposed, while the upwardly curved rear ends of the plates 31 of said members 30 are disposed considerably below such a plane.

With the parts disposed as above described, an egg deposited upon the fingers 27 will roll downwardly therefrom onto the sheet 28 and will then travel onto the tracks 26. Upon the latter, the egg will now roll downwardly and will strike the projecting upper ends of the several actuating fingers 33 of the checks 30. As the egg continues in its downward travel, however, the weighted plates 31 again return the members 30 to their normal positions. It is to be noted, however, that the first egg rolling down the chute is checked by the cushion 29, in such a position as to prevent the member 30 from returning to its normally inactive position. It will thus be seen that the plate 31 of this lowermost member 30 is disposed in an upright position and is spaced from the egg resting upon its finger 33. Since all of the members 30 are formed of very resilient material, it follows that the projecting upper end of the lowermost plate 31 will act as a cushioning device for the second egg traveling down the chute. It will be evident that this second egg will retain the second check 30 in active position and that similar operations take place each time an egg is rolled down the chute, the latter having a capacity of one-half dozen. Needless to say, when the chute is filled, it may be removed for the purpose of removing its contents, and may then be again disposed to active position.

It may here be explained that whether the door 8 be raised or lowered, the chute 23 may be removed, since the notch 9 in the lower edge of said door receives the chute. This also allows the door to be lowered the necessary amount, it being evident that this could not be accomplished were it not for said notch.

In the foregoing, I have described certain specific details of construction for obtaining probably the best results, and in the drawings have shown such details, but it will be evident that I need not be limited thereto, otherwise than as specified in the appended claims. Particular emphasis is laid upon the provision of the normally inactive egg checks which are successively disposed to active position by eggs rolling down the chute. Furthermore, by constructing these checks as shown in the drawings, they may be struck from a single strip of metal, a plurality of V-shaped cuts providing not only the notches 32 but the pointed fingers 33.

I claim:—

1. The combination with an inclined chute and means to deliver eggs thereto, of an egg check at the lower end of the chute, an additional movably mounted and normally inactive egg check spaced upwardly of the chute from the first named check, and a check actuating member carried by the additional check and disposed in the path of an egg moving downwardly on the chute, whereby to project the additional check upon the passage of an egg thereover.

2. The combination with an inclined chute and means to deliver eggs thereto, of an egg check at the lower end of the chute, an additional pivotally mounted and normally inactive egg check spaced upwardly of the chute from the first named check, and a check actuating member carried by the additional check and disposed in the path of an egg moving downwardly on the chute, whereby to project said additional check upon the passage of an egg thereover.

3. The combination with a channel-shaped egg chute and means to deliver eggs thereto, of an egg check disposed at the lower end of the chute, and an additional substantially right angular check spaced upwardly of the chute from the first named check and having one of its ends disposed in the path of an egg moving downwardly on the chute, and a pivotal mounting for said additional check.

4. The combination with an inclined chute and means to deliver eggs thereto, of a pair of resilient receiving fingers carried by the chute and adapted to receive the eggs therebetween.

5. The combination with an inclined egg chute, and means to deliver eggs thereto, of a pair of resilient and upwardly converging egg receiving fingers secured to the chute and disposed substantially in the plane thereof.

In testimony whereof I have hereunto set my hand in presence of two subscribing witnesses.

GEORGE L. CARR.

Witnesses:
PETER H. ZIMMERMAN,
VICTOR B. ZIMMERMAN.

Copies of this patent may be obtained for five cents each, by addressing the "Commissioner of Patents, Washington, D. C."